(12) United States Patent
Liu

(10) Patent No.: US 7,783,178 B2
(45) Date of Patent: Aug. 24, 2010

(54) IMAGE ACQUIRING AND TRANSFORMING APPARATUS

(76) Inventor: Paul Liu, 1F, No. 14, Alley 18, Lane 325, Jian-Kang Road, Taipei (TW)

( * ) Notice: Subject to any disclaimer, the term of this patent is extended or adjusted under 35 U.S.C. 154(b) by 156 days.

(21) Appl. No.: 12/272,788

(22) Filed: Nov. 18, 2008

(65) Prior Publication Data

US 2010/0073902 A1 Mar. 25, 2010

(51) Int. Cl.
*G03B 15/02* (2006.01)

(52) U.S. Cl. .......................................... 396/4

(58) Field of Classification Search ...................... 396/4, 396/5, 16, 155, 200; 362/3, 11, 16–18

See application file for complete search history.

(56) References Cited

U.S. PATENT DOCUMENTS 7,377,660 B2 * 5/2008 Izumi ............................ 362/3

* cited by examiner

*Primary Examiner*—W. B. Perkey

(57) ABSTRACT

An image acquiring and transforming apparatus having a uniform light source is provided. The image acquiring and transforming apparatus includes a housing, a compensatory light source, an image acquiring unit and a light uniforming member. The light uniforming member is dome shaped. The dome shaped light uniforming member has an inner wall configured with a light reflective surface adapted for uniforming a light illuminated thereon. The compensatory light source is disposed inside the housing. The compensatory light source, the light uniforming member and the image acquiring unit are disposed in the housing in that order. When the compensatory light source projects a light onto the light uniforming member, the light is uniformly reflected to uniformly illuminate an object positioned at a predetermined position. In such a way, the image acquiring unit can clearly acquire the image of the object, and transform the acquired image into a digital file for saving.

6 Claims, 5 Drawing Sheets

IMAGE ACQUIRING AND TRANSFORMING APPARATUS

BACKGROUND OF THE INVENTION

1. Field of the Invention

The present invention relates generally to an image acquiring and transforming apparatus having a uniform light source. Specifically, the image acquiring and transforming apparatus is adapted for clearly and effectively acquiring images, and transforming the acquired images into a digital file for saving.

2. The Prior Arts

Conventional optical cameras have been almost entirely substituted by digital cameras. Comparing with the digital cameras, a conventional optical camera records acquired images onto films (negatives), and thereafter displays the images in a form of photographs or slides to the viewers. Differing from the conventional optical camera, a typical digital camera transforms the acquired images into a digital file. The viewer can select to view the images by playing the digital file with an image player or develop the digital file to obtain photographs of the acquired images. Digital image files are incomparably convenient for recording and using relative to the conventional films and photographs. As such, the conventional films, photographs, and slides are now rarely used by modern people, so that it has become inconvenient to output images saved in the conventional approaches. However, the conventional optical cameras have been used for several decades after all, and there are many valuable conventional photographs accumulated and should be well protected and saved. Therefore, how to maintain and protect these accumulated photographs becomes a subject for many people.

Accordingly, many people select to duplicate the conventional photographs with a digital camera, and then transform the acquired images of the conventional photographs into a digital file for saving. This to some extent provides a solution for maintaining and protecting the conventional photographs. However, when desiring to achieve the optimal effect of the duplicated images which approach the original images as much as possible, these people may have to rely upon professionals to carry out the duplication. However, professionals often quote for an expensive cost for the duplication service, and such a professional service often consumes a long time.

Correspondingly, some manufactures have developed transforming apparatuses for directly transforming the conventional photographs into digital forms (e.g., a digital file). However, such a transforming apparatus is only capable of duplicating the photographs, and often lacks compensatory light provided thereto so that the acquired images are often dark and have an unsatisfactory quality. Further, even though some of the transforming apparatuses have been provided with a compensatory light source, the compensatory light source often provides a nonuniform compensatory light so that the acquired images may also have an unsatisfactory quality. As such, it is highly desired to develop a method or an apparatus adapted for transforming conventional photographs into a digital image file. Having such an apparatus, a consumer is allowed to transform the conventional photographs into a digital image file by executing a simple process by himself without relying upon professionals. Therefore, such a method or apparatus provides a more convenient and simpler approach for those having conventional photographs and not having a digital file of the conventional photographs for image saving and protection.

SUMMARY OF THE INVENTION

A primary objective of the present invention is to provide an image acquiring and transforming apparatus having a uniform light source. The image acquiring and transforming apparatus is adapted for transforming conventional photographs into a digital file and also for acquiring an image of a stereoscopic object. By conveniently operating such an apparatus, one is allowed for transforming the conventional photographs into a digital file with an optimal performance, thus avoiding damages caused to the conventional photographs, without aids of professional staff or equipment.

The present invention provides an image acquiring and transforming apparatus having a uniform light source. The image acquiring and transforming apparatus includes a housing, a compensatory light source, an image acquiring unit and a light uniforming member. The light uniforming member is dome shaped. The dome shaped light uniforming member has an inner wall configured with a light reflective surface adapted for uniforming a light illuminated thereon. The compensatory light source is disposed inside the housing. The compensatory light source, the light uniforming member and the image acquiring unit are disposed in the housing in that order. When the compensatory light source projects a light onto the light uniforming member, the light is uniformly reflected to uniformly illuminate an object positioned at a predetermined position. In such a way, the image acquiring unit can clearly acquire the image of the object, and transform the acquired image into a digital file for saving.

In comparison with the conventional optical cameras and other conventional technologies, the image acquiring and transforming apparatus according to the present invention has at least the following advantages:

(1) The image acquiring and transforming apparatus is adapted for transforming an image of a photograph, a picture, or a stereoscopic object into a digital image file;

(2) The user can operate the image acquiring and transforming apparatus, instead of relying upon professionals, thus saving much time and expense; and (3) The image acquiring and transforming apparatus is adapted for drastically improving the quality of the acquired images of the photograph or the picture.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
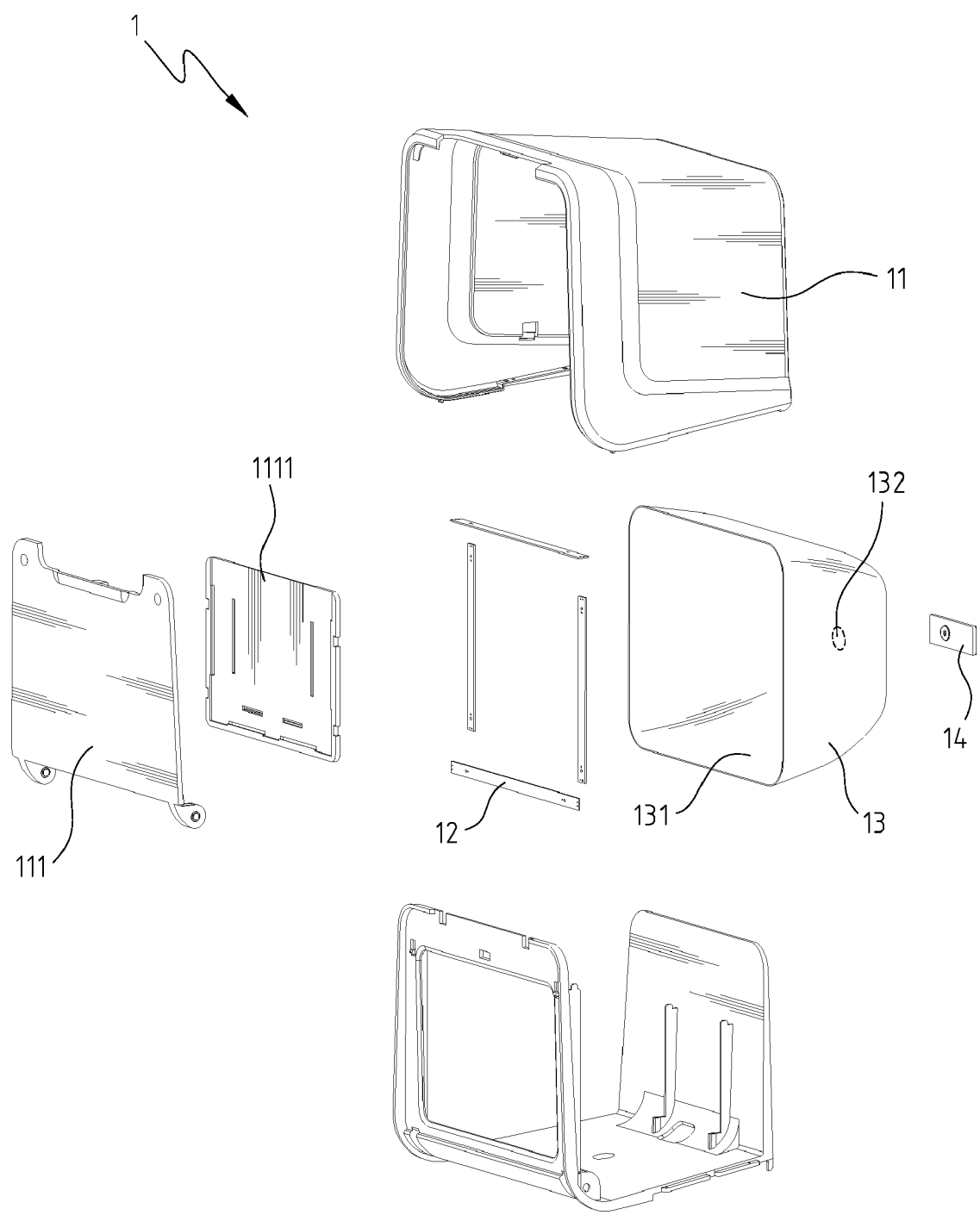
FIG. 1 is an exploded view of an image acquiring and transforming apparatus according to an embodiment of the present invention.
Figure 2:
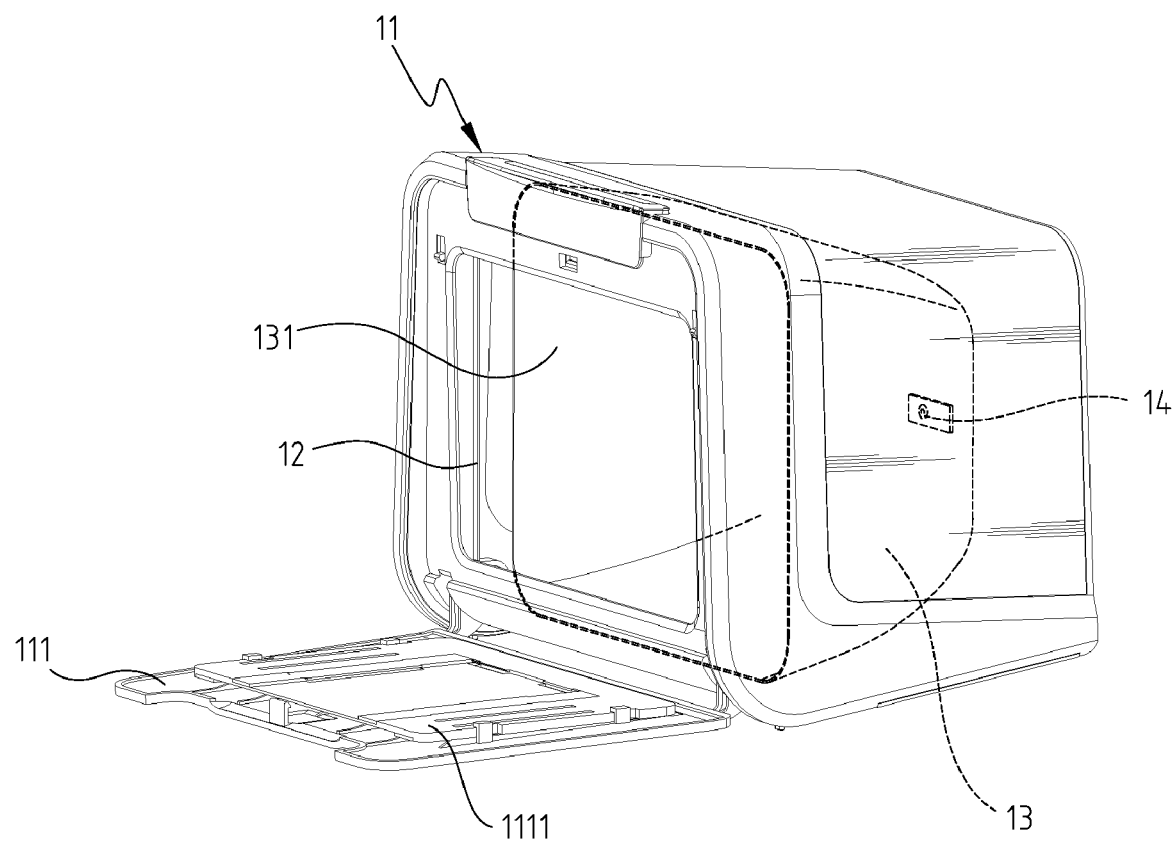
FIG. 2 is a perspective view of the image acquiring and transforming apparatus according to an embodiment of the present invention.
Figure 4:
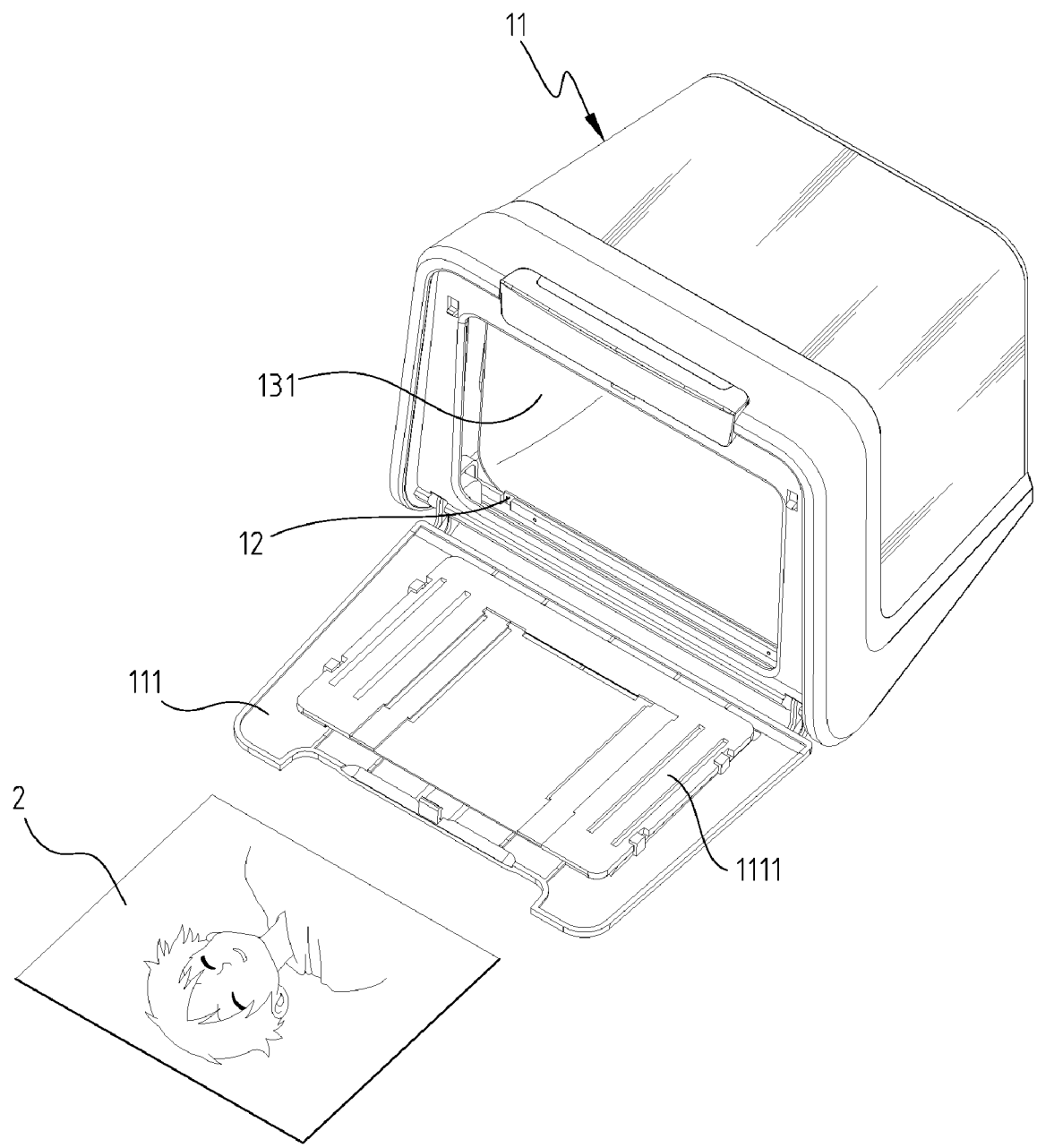
FIG. 4 is a schematic view illustrating the image acquiring and transforming apparatus according to an embodiment of the present invention.

Referring to FIGS. 1 and 2, there is shown an image acquiring and transforming apparatus 1 having a uniforming light source according to an embodiment of the present invention. The image acquiring and transforming apparatus 1 includes a housing 11, a compensatory light source 12, a light uniforming member 13, and an image acquiring unit 14. The housing 11 is adapted to achieve an entirely closed configuration by covering a rotatable plate 111 on an opening configured at an opening end of the housing 11. The rotatable plate 111 for example can be pivotally connected to the opening end of the housing 11. When the rotatable plate 111 is pivotally moved apart from the opening of the opening end of the housing 11, the entirely closed configuration of the housing 11 is opened. In this case, an object 2 (e.g., a picture or a photograph) to be shot is positioned on the rotatable plate 111, as shown in FIG. 4. Further, the rotatable plate 111 further preferably includes a plate clip 1111 for fixing the object 2 onto the rotatable plate 111. Then, the rotatable plate 111 is rotated to cover on the opening of the opening end of the housing 11, where the housing 11 achieves the entirely closed configuration. Therefore, the object 2 to be shot is correspondingly moved together with the rotatable plate 111 to a predetermined position which is convenient for the image acquiring unit 14 to acquire an image of the object 2 to be shot. The compensatory light source 12 and the light uniforming member 13 are positioned between the object 2 and the image acquiring unit 14. The light uniforming member 13 is a dome shaped and is disposed inside the housing 11. The compensatory light source 12 is peripherally provided corresponding to a boundary of a mouth of the dome shaped light uniforming member 13. Preferably, the mouth of the dome shaped light uniforming member 13 is configured with a rectangular shape, and correspondingly the compensatory light source 12 includes four units disposed corresponding to four sides of the rectangular shaped mouth of the dome shaped light uniforming member 13, respectively.

Figure 3:
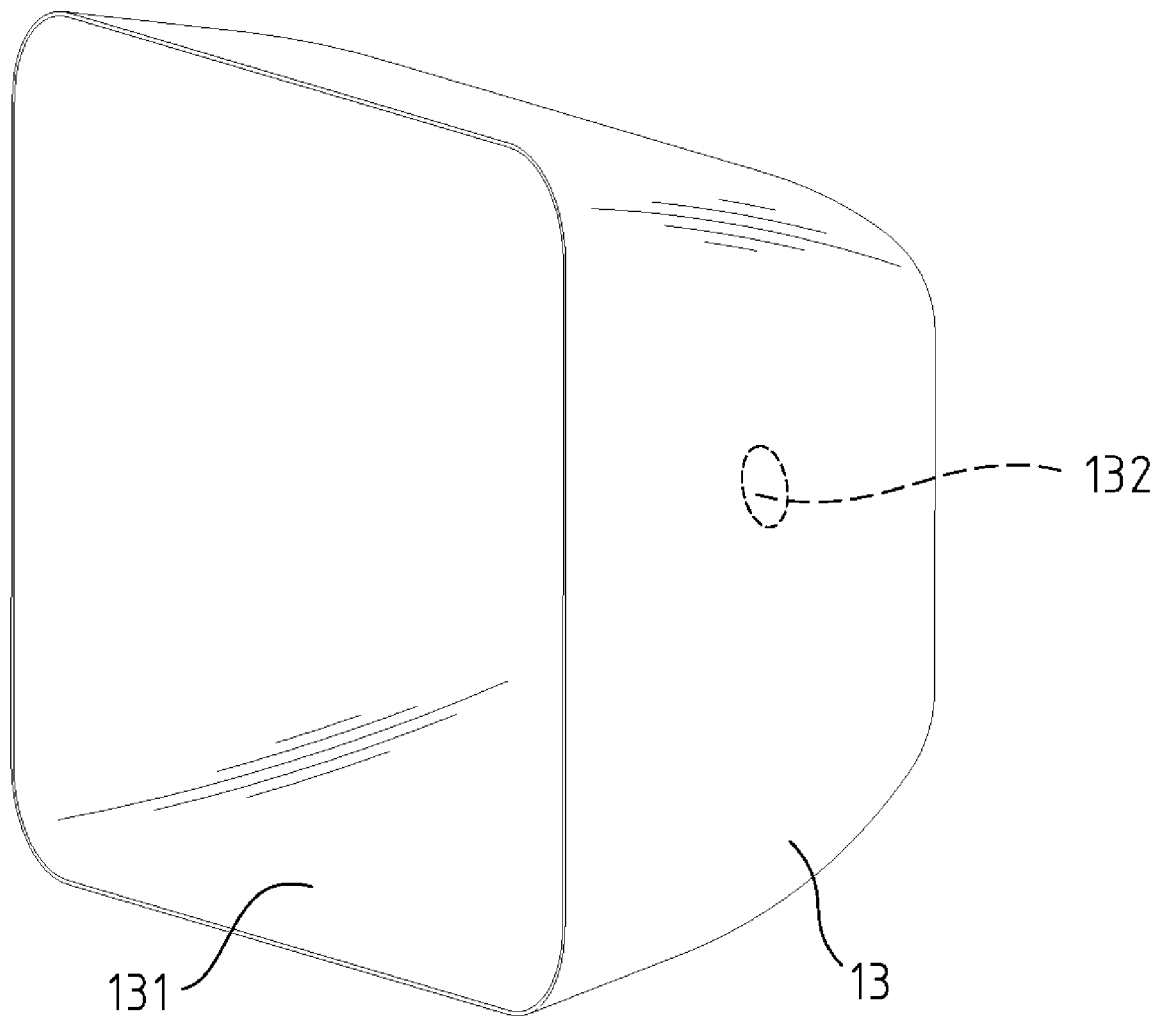
FIG. 3 is a perspective view of a light uniforming member according to an embodiment of the present invention.

Referring to FIG. 3, the dome shaped light uniforming member 13 has an inner wall configured with a light reflective surface 131 adapted for uniforming a light illuminated thereon. Preferably, the reflective surface 131 of the inner wall of the light uniforming member 13 is a rough surface, so that when a light is casted from the compensatory light source 12 onto the light uniforming member 13, the light will be irregularly or diffusely reflected. In such a way, the light emitted from the compensatory light source 12 can be uniformly provided to the object 2. The dome shaped light uniforming member 13 is further configured with a window 132 at a peak of the dome. The window 132 is specifically positioned for allowing the image acquiring unit 14 to acquire the image of the object 2 from the window 132. The image acquiring unit 14 is further adapted for transforming the acquired image into a digital file for saving.

Figure 5:
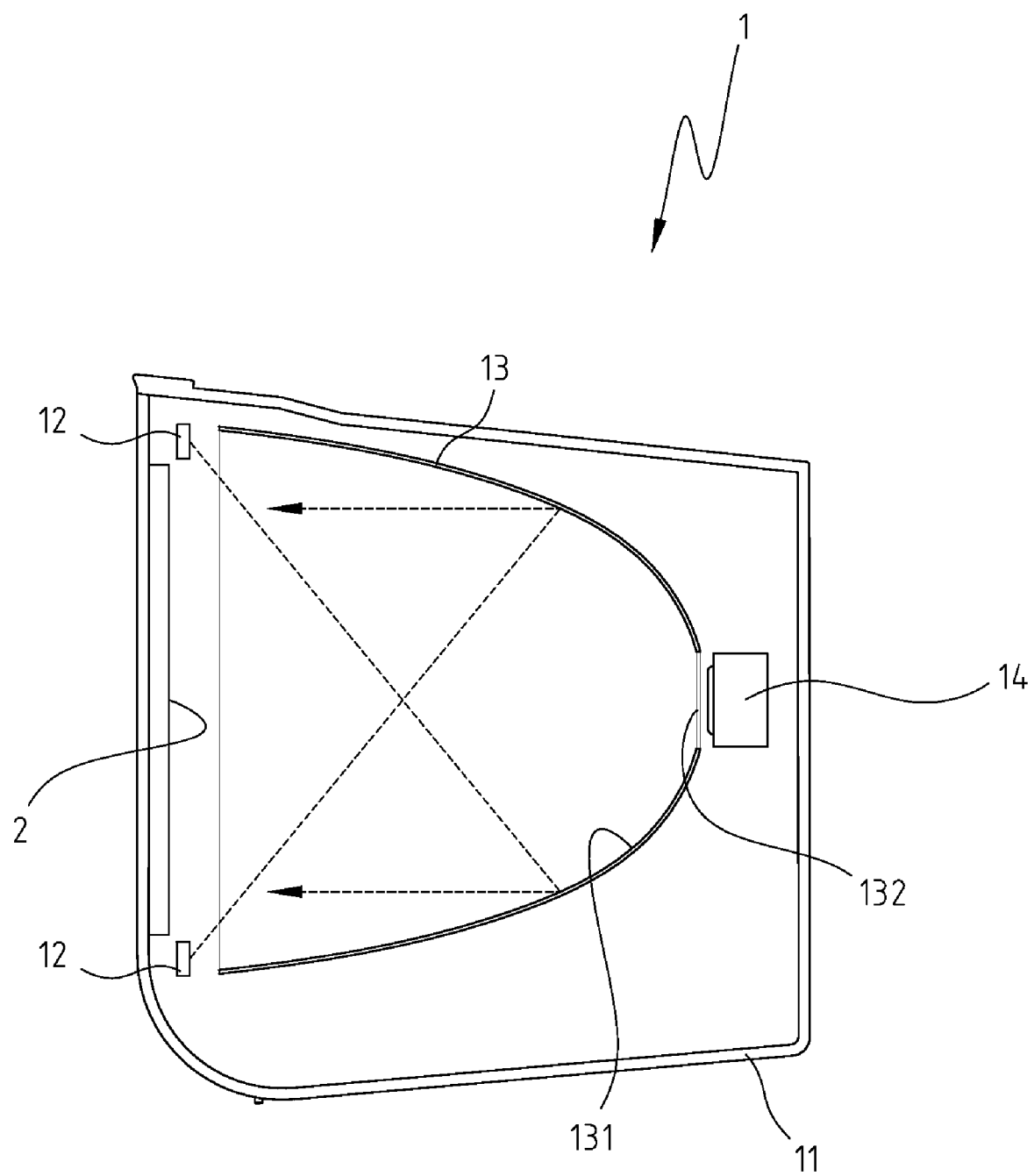
FIG. 5 is a schematic view illustrating the image acquiring and transforming apparatus according to an embodiment of the present invention.

Referring to FIGS. 4 and 5, in operation, when the image acquiring and transforming apparatus 1 is used to acquire an image of the object 2, the entirely closed housing 11 is firstly opened, in which the rotatable plate 111 is rotated apart from the opening of the opening end of the housing 11. Then, the object 2 is fixed by the plate clip 1111 onto an inner side of the rotatable plate 111. The rotatable plate 111 is then rotated back to cover the opening of the opening end of the housing 11. In such a way, the object 2 is correspondingly moved together with the rotatable plate 111 to a predetermined position inside the housing 11, so that the image acquiring unit 14 can conveniently acquire the image of the object 2 from the window 132. When the image acquiring unit 14 acquires the image of the object 2, the compensatory light source 12 provides a compensatory light. The compensatory light illuminates onto the rough surface of the inner wall of the light uniforming member 13, and is diffused and uniformed thereby to configure a uniform light. The uniform light is reflected back to illuminate on the object 2, thus improving an imaging condition, so that the image acquiring unit 14 can acquire the image of the object 2 with an optimal image quality, and transforming the image for saving thereafter.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An image acquiring and transforming apparatus, comprising:
    a housing, adapted to achieve an entirely closed configuration;
    a light uniforming member which is dome shaped and disposed inside the housing, wherein the dome shaped light uniforming member has an inner wall configured with a light reflective surface adapted for uniforming a light illuminated thereon;
    a compensatory light source, peripherally positioned adjacent to a mouth of the dome shaped light uniforming member; and
    an image acquiring unit, disposed inside the housing at adjacent to an peak of the dome shaped light uniforming member and opposite to an object to be shoot by the image acquiring unit,
    wherein the compensatory light source provides a compensatory light illuminating onto the light reflective surface of the inner wall of the light uniforming member, and the light is uniformly reflected by the light reflective surface to uniformly illuminate the object to be shoot, thus allowing the image acquiring unit to acquire an image of the object facilitated by the uniform light illuminated on the object, and transform the image into a digital file for saving.

2. The image acquiring and transforming apparatus according to claim 1, wherein the housing further comprises a rotatable plate pivotally connected to an opening end of the housing for covering an opening configured at the opening end of the housing, by which the entirely closed configuration of the housing can be achieved.

3. The image acquiring and transforming apparatus according to claim 1, wherein the mouth of the light uniforming member is configured with a rectangular shape.

4. The image acquiring and transforming apparatus according to claim 1, wherein the compensatory light source comprises four units.

5. The image acquiring and transforming apparatus according to claim 1, wherein the dome shaped light uniforming member is configured with a window at the peak of the dome shaped light uniforming member for allowing the image acquiring unit to acquire the image of the object therefrom.

6. The image acquiring and transforming apparatus according to claim 2, wherein the rotatable plate is further provided with a plate clip for fixing the object to be shot onto the rotatable plate.

* * * * *